United States Patent [19]
Ainsworth

[11] Patent Number: 5,387,648
[45] Date of Patent: Feb. 7, 1995

[54] THERMOPLASTIC ELASTOMERS BASED UPON CHLOROSULFONATED POLYETHYLENE AND A CRYSTALLINE OLEFIN POLYMER

[75] Inventor: Oliver C. Ainsworth, Baton Rouge, La.

[73] Assignee: The Dow Chemical Company, Midland, Mich.

[21] Appl. No.: 172,972

[22] Filed: Dec. 27, 1993

Related U.S. Application Data

[60] Division of Ser. No. 45,282, Apr. 8, 1993, Pat. No. 5,286,795, which is a continuation of Ser. No. 629,501, Dec. 18, 1990, abandoned, which is a continuation-in-part of Ser. No. 462,666, Jan. 4, 1990, Pat. No. 4,978,703.

[51] Int. Cl.$^6$ .............. C08L 23/28; C08L 23/34; C08L 23/26

[52] U.S. Cl. .............. 525/192; 525/194; 525/195; 525/240

[58] Field of Search ........... 525/192, 194, 195, 240

[56] References Cited

U.S. PATENT DOCUMENTS

| | | | |
|---|---|---|---|
| 4,128,510 | 12/1978 | Richwine | 528/36 |
| 4,141,878 | 2/1979 | Coran et al. | 525/240 |
| 4,288,576 | 9/1981 | Richwine | 525/239 |
| 4,910,245 | 3/1990 | Flynn et al. | 525/194 |

*Primary Examiner*—Carman J. Seccuro, Jr.

[57] ABSTRACT

A chlorosulfonated or chlorinated polyethylene dispersed in a polyolefin, vulcanized and then the vulcanizate dispersed into a thermoplastic chlorosulfonated or chlorinated polyethylene forming a partially crosslinked thermoplastic chlorosulfonated or chlorinated polyethylene vulcanizate having good interply adhesion, hot weld strength, commercial processability, and crack resistance.

5 Claims, No Drawings

THERMOPLASTIC ELASTOMERS BASED UPON CHLOROSULFONATED POLYETHYLENE AND A CRYSTALLINE OLEFIN POLYMER

CROSS REFERENCE TO RELATED APPLICATION

This application is a divisional of application Ser. No. 08/045,282, filed Apr. 8, 1993, now Pat. No. 5,286,795, which is a continuation of application Ser. No. 07/629,501, filed Dec. 18, 1990, abandoned, which is a continuation-in-part of Appl. Ser. No. 07/462,666, filed Jan. 4, 1990, and issued as U.S. Pat. No. 4,978,703.

BACKGROUND OF THE INVENTION

The present invention generally concerns thermoplastic elastomer compositions comprising blends of chlorosulfonated polyethylene and a crystalline olefin polymer. Especially concerned are vulcanized chlorosulfonated polyethylene blended with crystalline polyolefins and blended with either thermoplastic chlorinated polyethylene or thermoplastic chlorosulfonated polyethylene or mixtures of these. The present invention also concerns preparation of said compositions by dynamic vulcanization or by a sequential combination of dispersion of the vulcanized material and dispersion of the remaining chlorinated polyethylene. The present invention further concerns the use of a non-peroxide cure package to accomplish said dynamic vulcanization.

Thermoplastic elastomers, which can be processed and fabricated by methods used for thermoplastics and do not require vulcanization to develop elastomeric properties, are known (see, for example, U.S. Pat. No. 3,265,765 as well as Hartman et al., "Butyl Grafted to Polyethylene Yields Thermoplastic Elastomer," Rubber World, October 1970, pp. 59–64).

Dynamic vulcanization is a process whereby a blend of plastic, rubber and rubber curative is masticated while curing the rubber. The term "dynamic" indicates the mixture is subjected to shear forces during the vulcanization step as contrasted with "static" vulcanization wherein the vulcanizable composition is immobile (in fixed relative space) during vulcanization. One advantage of dynamic vulcanization is that elastoplastic (thermoplastic elastomeric) compositions may be obtained when the blend contains the proper proportions of plastic and rubber. Dynamic vulcanization processes are described in U.S. Pat. Nos. 3,037,954, 3,806,558, 4,104,210, 4,116,914, 4,130,535, 4,141,863, 4,141,878, 4,173,556, 4,207,404, 4,271,049, 4,287,324, 4,288,570, 4,299,931, 4,311,628 and 4,338,413.

Known dynamic vulcanization processes are believed to be somewhat unsuitable for making soft compositions because as the rubber level rises the resulting compositions become less fabricable. In other words, the compositions give poor extrudates and, sometimes, cannot be extruded at all. Accordingly, there is a need for processes for preparing soft, extrusion-fabricable, thermoplastic elastomeric compositions.

U.S. Pat. 4,130,535 discloses thermoplastic vulcanizates or blends of polyolefin resin and monoolefin copolymer rubber which are processable in the same manner as thermoplastics even though the rubber is fully cured. The thermoset state is avoided by simultaneously masticating and curing the blends. The blends comprise about 25–95 percent by weight of the resin and about 75–5 percent by weight of the rubber. Oil extended vulcanizates have a ratio of 35 to 65 percent of the resin and about 65 to 35 percent of the rubber. Peroxide, azide and sulfur vulcanizing agents may be used to effect curing of the rubber. Typical monoolefin copolymer rubbers include saturated EPM (ethylene-propylene rubbers) or unsaturated EPDM (ethylene-propylene-diene terpolymer rubbers).

U.S. Pat. No. 4,594,390 teaches that improved thermoplastic elastomer materials are obtained when a composition comprising polypropylene, an EPDM rubber, an extender oil and a curative is masticated at a shear rate of at least 2000 sec$^{-1}$. Suitable results are obtained with shear rates of 2500 to 7500 sec$^{-1}$.

U.S. Pat. No. 4,207,404 discloses thermoplastic elastomer compositions prepared by dynamic vulcanization of blends of chlorinated polyethylene and nylon in the presence of a peroxide vulcanizing agent.

U.S. Pat. No. 3,806,558 discloses partially cured blends of a monoolefin copolymer rubber, such as those disclosed in U.S. Pat. No. 4,130,535, and a polyolefin plastic, usually polyethylene or polypropylene. The blend is mixed with a small amount of curative, and subjected to curing conditions while working the mixture dynamically.

A. Y. Coran, R. P. Patel and D. Williams, in an article entitled "Rubber-Thermoplastic compositions. Part V. Selecting Polymers for Thermoplastic Vulcanizates," Rubber Chemistry and Technology, Vol. 55, 116 (1982), describe approximately one hundred thermoplastic vulcanizate compositions, based on nine kinds of thermoplastic resin and eleven kinds of rubber. All compositions contain sixty parts of rubber and forty parts of plastic. They prepare these compositions by melt mixing the plastic, rubber and other components in a Brabender or Haake mixer. Generally, the plastic, rubber and other components of the composition, except for curatives, are mixed at controlled elevated temperatures (Table I) for about 2–6 minutes during which time the plastic melts and a blend is formed with the rubber. After blend formation, curatives are added to crosslink the rubber, and mixing is continued until a maximum consistency or mixing torque is observed. Each composition is removed from the mixer and then remixed for an additional minute in the molten state to insure uniformity of the mixture. One of the rubber materials is chlorinated polyethylene (CPE). The plastic materials, listed in Table I on page 117, include polypropylene (PP), polyethylene (PE), polystyrene (PS), an acrylonitrile-butadiene-styrene polymer (ABS), a styrene-acrylonitrile copolymer (SAN), polymethyl methacrylate (PMMA), poly-tetramethylene terephthalate (PTMT), Nylon-6,9 (PA) and polycarbonate (PC). One of the mechanical properties, tension set (ASTM D412-66), is determined by stretching 51 mm long specimens to 102 mm for 10 minutes then by measuring set after 10 minutes relaxation. Chlorinated polyethylene compositions are cured by peroxides, specifically 2,5-dimethyl-2,5-bis(t-butyl peroxy)hexane. Tension set values abstracted from Table IX at page 125 are as follows: (a) CPE/PP-55%; (b) CPE/PE-58%; (c) CPE/ABS-65%; (d) CPE/ABS-91%; (e) CPE/PMMA-82%; (f) CPE/PTMT-40%; (g) CPE/PA-59%; and (h) CPE/PC-85%. They note that the 40% value may not be accurate because the CPE is insufficiently stable to withstand processing at the high melt temperatures for PTMT.

One of the applications for chlorosulfonated polyethylene vulcanizate blend compositions is in single-ply roofing membranes. However, microbial action causes cracking or "alligatoring" in chlorosulfonated polyethylene-based membranes. While thermoplastic chlorosulfonated polyethylene is easily fabricable in sheet form, it tends to crack. While thermoset or vulcanized chlorosulfonated polyethylene is more resistant to microbial cracking, it is less easily fabricable. Therefore, a blend of the two would be advantageous for blending the features of both. However, it is not possible to partially crosslink or vulcanize one chlorosulfonated polyethylene in the presence of another without also affecting the other.

SUMMARY OF THE INTENTION

In previous work, there was identified compositions of thermoplastic and thermoset elastomer materials employing chlorinated polyethylene elastomer materials. It has now been found that chlorosulfonated polyethylene, as well as, various mixtures or blends of chlorinated and chlorosulfonated polyethylene polymers blended or crosslinked with crystalline thermoplastic polyolefin polymers have features not known to previously available elastomeric compositions of the single polymers themselves or which skilled practitioners would be lead to employ.

In one aspect the present invention provides a process for preparing a blend thermoset elastomer material having a tension set value, at 100% elongation, of less than about 50% from a blend of an amorphous chlorosulfonated polyethylene, and a crystalline thermoplastic polyolefin polymer, the process comprising:

a. forming a heat-plastified, substantially uniform admixture comprising an amorphous chlorosulfonated polyethylene, a crystalline thermoplastic polyolefin polymer and an inorganic base; and b. dispersing a vulcanizing material for the chlorosulfonated polyethylene throughout the admixture while mixing said admixture at a temperature sufficient to activate the vulcanizing material without substantially degrading any component of the composition and for a period of time sufficient to cure substantially all of the chlorosulfonated polyethylene, the vulcanizing material comprising (1) a derivative of 2,5-dimercapto-1,3,4-thiadiazole or (2) a combination of 2,5-dimercapto-1,3,4-thiadiazole and an activator material.

One aspect of the present invention is a process for preparing a partially crosslinked blend thermoplastic elastomer material from a blend of an amorphous chlorosulfonated polyethylene, a crystalline thermoplastic polymer, and a thermoplastic chlorosulfonated polyethylene, the process comprising:

a. forming a heat-plastified, substantially uniform admixture comprising an amorphous chlorosulfonated polyethylene, a crystalline thermoplastic polymer and a basic material;

b. dispersing a vulcanizing material for the chlorosulfonated polyethylene throughout the admixture while mixing said admixture at a temperature sufficient to activate the vulcanizing material without substantially degrading any component of the composition and for a period of time sufficient to cure substantially all of the chlorosulfonated polyethylene, the vulcanizing material comprising (1) a derivative of 2,5-dimercapto-1,3,4-thiadiazole or (2) a combination of 2,5-dimercapto-1,3,4-thiadiazole and an activator material; and c. dispersing in the vulcanized admixture prepared in step (b), a material comprising a chlorosulfonated polyethylene free from additional vulcanizing material for a period of time sufficient to achieve substantially uniform admixture and at a temperature sufficient to produce a molten partially crosslinked blend of a thermoset chlorosulfonated polyethylene in a thermoplastic chlorosulfonated polyethylene.

The present invention also relates to the thermoplastic elastomer materials so prepared in both of the above aspects. These materials suitably have a tension set value, at 100% elongation (ASTM D412), of less than about 50%. Materials having tension set values of greater than 50% are believed to be unsuitable for use as elastomers. Thus, another aspect of the present invention is a thermoplastic elastomeric composition resistant to environmentally induced cracking, in which the composition comprises a blend of about 10 to about 75 parts by weight of an admixture of a crosslinked amorphous chlorosulfonated polyethylene, about 10 to about 65 parts by weight a crystalline thermoplastic polyolefin resin, the crosslinking being carried out in the presence of a vulcanizing package initially present at from about 0.5 to about 1.5 parts by weight, the residue of which is present, and from about 15 to about 60 parts by weight of a semicrystalline chlorosulfonated polyethylene dispersed therethrough as the continuous phase, forming a partially crosslinked blend elastomer which is resistant to environmental cracking.

A still further aspect of this invention relates to a thermoplastic composition which is a blend of an amorphous chlorosulfonated polyethylene and a crystalline thermoplastic polyolefin polymer, which has a tension set value, at 100% elongation, of less than about 50%, a decreased heat distortion value and a decreased percentage of shrinkage at 80° C. Further, another aspect of this invention is a blend thermoplastic elastomer composition, having therein a vulcanized elastomer which is an admixture of a vulcanized or crosslinked chlorinated polyethylene with a crystalline thermoplastic polyolefin polymer in which the admixture is further uniformly admixed with a thermoplastic chlorosulfonated polyethylene, forming a partially vulcanized admixture of a thermoset or vulcanized chlorinated polyethylene in a thermoplastic chlorosulfonated polyethylene.

DETAILED DESCRIPTION OF THE INVENTION

The crystalline thermoplastic polymer is a solid, high molecular weight, resinous plastic material made by polymerizing olefins such as ethylene, propylene, butene-1, pentene-1, 4-methylpentene, and the like by conventional processes. Illustrative polymers include low density polyethylene (0.910 to 0.925 grams per cubic centimeter (g/cc)), medium density polyethylene (0.926 to 0.940 g/cc) or high density polyethylene (0.941 to 0.965 g/cc), whether prepared by high pressure processes or low pressure processes. Polyesters such as polyethylene terephthalate may also provide suitable results. Particularly suitable polymers include the crystalline forms of polypropylene. Crystalline block copolymers of ethylene and propylene (which are plastics distinguished from amorphous, random ethylene-propylene elastomers) can also be used. Included among the polyolefin resins are the higher alpha-olefin modified polyethylenes and polypropylenes (see, "Polyolefins," N. V. Boenig, Elsevier Publishing Co., N.Y. 1966).

Materials other than crystalline thermoplastic polymers may be used in conjunction with the amorphous chlorosulfonated or chlorinated polyethylene provided such materials are mechanically compatible therewith. "Mechanically compatible", as used herein, means that the polymers form a two phase mixture that does not undergo substantial delamination. Illustrative materials believed to meet this criterion include glassy polymers such as polycarbonates, styrene-acrylonitrile copolymers and terpolymers of acrylonitrile, butadiene and styrene.

The chlorosulfonated polyethylene useful in this invention is typically a material having from about 20 to about 48 weight percent chlorine and from about 0.4 to about 3.0 weight percent sulfur. Typical preparations of chlorosulfonated polyethylene are given in U.S. Pat. Nos. 2,586,363 and 2,503,252, the teachings of which are incorporated by reference.

Chlorinated polyethylene starting materials suitable for purposes of the present invention are finely-divided particles which must meet four physical property criteria. First, the materials must have a weight average molecular weight of from about 40,000 to about 300,000. Second, the materials must have a chemically combined chlorine content of from about 20 to about 48 percent by weight of polymer. Third, the materials must have a 100 percent modulus, measured in accordance with ASTM Test D-412, from about 0.5 to about 4.8 MPa. Fourth, the materials must have a heat of fusion of from about 0 to about 15 calories per gram, preferably from about 0 to about ten calories per gram.

Chlorinated polyethylene materials meeting the aforementioned physical property criteria can be prepared by a chlorinated procedure of the type disclosed in U.S. Pat. No. 3,454,544, the teachings of which are incorporated herein by reference thereto.

Satisfactory chlorinated polyethylene resins are readily obtained by practice of a chlorination procedure which comprehends suspension chlorination, in an inert medium, of a finely divided, essentially linear polyethylene or olefin interpolymer. The interpolymer contains at least about 90 mole percent ethylene with the remainder being one or more ethylenically unsaturated monomers polymerizable therewith. The polymer is first chlorinated at a temperature below its agglomeration temperature for a period of time sufficient to provide a partially chlorinated polymer having a chlorine content of from about 2 to 23 percent chlorine, based on the total weight of polymer. This is followed by sequential suspension chlorination of the partially chlorinated polymer, in a particulate form, at a particular temperature. The particular temperature is, with respect to the olefin interpolymer, above its agglomeration, temperature but at least about 2° Centigrade below its crystalline melting point. Sequential chlorination is continued for a period of time sufficient to provide a chemically combined chlorine content of up to about 48 percent by weight of polymer.

Useful ethylenically unsaturated monomers include non-aromatic hydrocarbon olefins having three or more carbon atoms such as propylene, butene-1,1,4-hexadiene, 1,5-hexadiene, octene-1,1,7-octadiene, 1,9-decadiene and the like; substituted olefins such as acrylic acid, acrylic acid esters and the like; alkenyl aromatic compounds such as styrene and its derivatives, and other known polymerizable materials.

The temperature at which chlorination normally leads to agglomeration of polymer particles depends to a large extent on the nature and molecular weight of the polymer to be chlorinated. In the case of crystalline and predominantly straight chain polyethylenes having a branching of the chains of less than one methyl group per 100 carbon atoms and a density of at least 0.94 grams per cubic centimeter, the temperature is above 95° Centigrade, in particular above 100° Centigrade or even about 110° Centigrade. In the case of polyethylenes having a relatively marked branching of the chains and a lower density, the temperature is lower, about 65° Centigrade.

The temperature employed in the sequential chlorination must be greater than that employed in the initial chlorination in order to prevent (a) retention of excessive undesirable crystallinity and (b) formation of nonuniformly chlorinated polymer. The temperature employed in the sequential chlorination must also be below the crystalline melting point of the polymer being chlorinated in order to prevent accelerated particle size growth and development of undesirable agglomeration of polymer particles.

After a polyolefinic material has been suspension chlorinated to a desired degree, it may easily be filtered from suspension in the inert suspending liquid, washed and dried to prepare it for subsequent use.

The present invention is not restricted to chlorinated polyethylene resins prepared by suspension or slurry chlorination procedures. Solution chlorination and bulk, or fluidized bed, chlorination procedures may also be used provided the polymers produced thereby meet the aforementioned requirements with regard to chlorine content and residual crystallinity.

The thermoplastic elastomers or vulcanizates of the present invention are suitably cured with a cure package comprising a basic material and 2,5-dimercapto-1,3,4-thiadiazole or a derivative thereof. These cure packages are disclosed in U.S. Pat. Nos. 4,128,510 and 4,288,576, the teachings of which are incorporated herein by reference thereto.

Peroxide cure packages are believed to be unsuitable for use in curing blends as disclosed herein, particularly where the crystalline olefin polymer is polypropylene. Physical properties and handling characteristics of the blends indicate either a lack of sufficient crosslinking or at least partial degradation of the polypropylene.

Illustrative derivatives of 2,5-dimercapto-1,3,4-thiadiazole include:

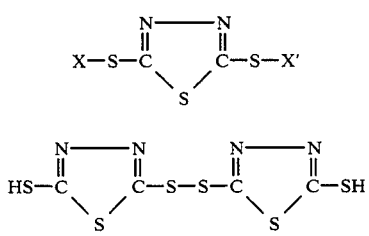

wherein X is a substituent selected from hydrogen, $$-CRR'OH, -(CH_2-CH-O)_nH,$$

-continued

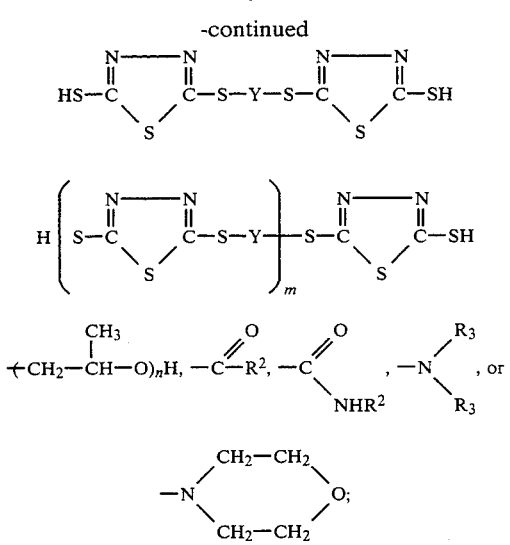

where m is an integer of from 2 to 10; n is an integer from 1 to 5; R and R' are selected from hydrogen, alkyl groups containing 1-8 carbon atoms, and aryl, alkaryl or aralkyl groups containing 6 to 8 carbon atoms; $R^2$ is an alkyl group containing 1-17 carbon atoms, an aryl group containing one or two rings, an alkaryl group containing 7-14 carbon atoms, an aralkyl group containing 7-8 carbon atoms or a cyclohexyl group; and $R^3$ is an alkyl group containing 1-8 carbon atoms. X' can be the same as X with the exception of hydrogen and Y is zinc, lead,

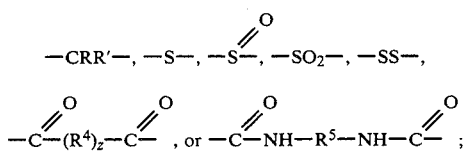

$R^4$ is an alkylene or alkenylene group containing 1-8 carbon atoms, or a cycloalkylene, arylene or a alkarylene group containing 6-8 carbon atoms; z is 0 or 1; and $R^5$ is an alkylene group containing 2-8 carbon atoms or a phenylene, methylphenylene or methylenediphenylene group.

Basic materials suitable for use in conjunction with derivatives of 2,5-dimercapto-1,3,4-thiadiazole include inorganic materials such as basic metal oxides and hydroxides and their salts with weak acids, such as, for example, magnesium hydroxide, magnesium oxide, calcium oxide, calcium hydroxide, barium oxide, barium carbonate, sodium phenoxide and sodium acetate. These basic materials also serve as heat stabilizers for chlorinated or chlorosulfonated polyethylene. Thus, they are beneficially admixed with the chlorinated polyethylene before the polymer blend is converted to a heat-plastified admixture rather than in conjunction with the thiadiazole derivative. Additional basic material may, if desired, be added together with the thiadiazole derivative. Other basic materials may also be used so long as they do not promote degradation of one of the components of the blend or deactivate the vulcanizing materials. The basic material is preferably magnesium oxide or magnesium hydroxide.

Basic or activator materials suitable for use in conjunction with 2,5-dimercapto-1,3,4-thiadiazole include (1) amines having a boiling point above about 110° C., and a pK value below about 4.5; (2) salts of amines having pK values below about 4.5 with acids having pK values above about 2.0; (3) quaternary ammonium hydroxides and their salts with acids having pK values above about 2.0; (4) diphenyl- and ditolylguanidines; and (5) the condensation product of aniline and at least one mono-aldehyde containing one to seven carbon atoms, in combination with at least an equal amount of an inorganic base. The term "pK value" refers to the dissociation constants of bases and acids in aqueous solution. Representative values are shown in the Handbook of Chemistry and Physics, 45th Edition, The Chemical Rubber Co., page D-76 (1964). As noted in the preceding paragraph, a certain amount of a basic material such as magnesium oxide or magnesium hydroxide must also be present to heat stabilize the chlorinated or chlorosulfonated polyethylene.

The plasticizing material is suitably selected from the group consisting of trimellitate esters, butyloleate phthalate esters, aromatic oils and polyesters of dicarboxylic acids containing from about two to about ten carbon atoms. The plasticizing material is desirably trioctyl trimellitate.

The ingredients save for the vulcanizing material are mixed at a temperature sufficient to soften the crystalline thermoplastic polymer or, more commonly, at a temperature above its melting point if the polymer is crystalline at ordinary temperatures. Blending is carried out for a time sufficient to form a generally uniform blend of the components. It is accomplished by any one of a number of conventional techniques, for example, in an internal mixer, two-roll mill or extruder. After the resin and rubber are intimately mixed, the vulcanizing material is added. Heating and masticating the blend components at vulcanization temperatures are generally adequate to complete curing in a few minutes. If shorter vulcanization times are desired, higher temperatures may be used, provided they are low enough to preclude substantial degradation of the chlorinated or chlorosulfonated polyethylene.

Suitable vulcanization temperatures range from about the melting temperature of the crystalline thermoplastic polymer (about 130° C. in the case of polyethylene and about 175° C. in the case of polypropylene) to 250° C. or more. Typically, the range is from about 150° C. to 225° C. A preferred range of vulcanization temperatures is from about 180° to about 200° C. Thermoplastic vulcanizates are beneficially prepared by continuously mixing the compositions, after the vulcanizing material is added, until vulcanization is complete.

If desired from an economic point of view, completion of vulcanization may be accomplished by static vulcanization provided sufficient curing by dynamic vulcanization has occurred before static vulcanization begins. If insufficient dynamic vulcanization occurs, an unprocessable thermoset vulcanizate may be obtained.

The chlorosulfonated or chlorinated polyethylene dispersed into the vulcanized admixture can be the same as that used in the vulcanization step or different. The primary difference being that the subsequently added chlorosulfonated or chlorinated polyethylene is thermoplastic and not a crosslinked material. Therefore, the finally added chlorosulfonated or chlorinated polyethylene can be either amorphous or semicrystalline, with the latter being preferred. It must also meet the four physical property criteria mentioned hereinabove for the chlorinated or chlorosulfonated polyethylene to be vulcanized. Preferably, the chlorine content can range from about 25 to about 48 percent based on the total polymer weight, with a more preferred chlorine content being from about 32 to about 44 weight percent based on the total polymer weight. The heat of fusion, measured by differential scanning calorimetry, for the thermoplastic chlorinated or chlorosulfonated polyethylene is in the range of about 0.2 to about 16 calories per gram, with 5 to 11 calories per gram being preferred. The residual sodium chloride can range from about 0.05 to about 0.5 weight percent based on the total weight of the resin, with from about 0.1 to about 0.4 being more preferred.

In a most preferred aspect, the chlorosulfonated or chlorinated polyethylene useful in the second dispersion step is prepared from a high density polyethylene interpolymer having a bimodal melt index. In one preferred aspect, the interpolymer useful in this invention is ethylene copolymerized with propylene, butene-1, or isobutylene, and more preferably with butene-1.

Still more preferably the interpolymer feedstock for the thermoplastic chlorinated polyethylene used in the second dispersion has a primary stage melt index of from about 0.25 to about 10.35 $I_5$ value, and a density of about 0.948 to about 0.952 gram per cubic centimeter. This polyolefin is used to prepare a chlorinated polyethylene having from about 32.5 to about 35.5 weight percent chlorine and a heat of fusion ranging from about 5 to about 11 calories per gram.

The properties of the thermoplastic vulcanizates of this invention may be modified, either before or after vulcanization, by adding ingredients which are conventional in the compounding of chlorinated or chlorosulfonated polyethylene elastomers, polyolefin resins and blends thereof. Skilled artisans will recognize, however, that chlorosulfonated or chlorinated polyethylene compounding additives generally must be added before vulcanization if they are to have an effect upon the chlorosulfonated or chlorinated polyethylene. The timing of addition is not as critical for addition of ingredients to the thermoplastic portion of the materials of the present invention.

Examples of suitable ingredients or additives include various carbon blacks, alumina, silica, titanium dioxide, calcium carbonate, colored pigments, clays, zinc oxide, stearic acid, accelerators, vulcanizing agents, sulfur, stabilizers, antioxidants, antidegradants, adhesives, tackifiers, plasticizers, processing aids such as lubricants and waxes, prevulcanization inhibitors, discontinuous fibers such as glass fibers and wood cellulose fibers, and extender oils. The amounts used depend, at least in part, upon the quantities of other ingredients in the composition and the properties desired from the composition. Minor amounts of other saturated and unsaturated polymers such as alpha-olefins may be added to reduce the cost or modify the properties of the composition.

Aromatic, naphthenic and paraffinic extender oils provide satisfactory results so long as they are used in amounts which do not exceed their limits of compatibility with chlorosulfonated or chlorinated polyethylene. Suitable extender oils are identified in *Rubber World Blue Book, Materials and Compounding Ingredients for Rubber* (1975), pages 145-190. The quantity of extender oil added depends upon the properties desired. The upper limit, which depends upon the compatibility of a particular oil and blend ingredients, is exceeded when excessive exudation of extender oil occurs. Typically, 5-150 parts by weight extender oil are added per 100 parts by weight of chlorosulfonated or chlorinated polyethylene. Commonly, from about 30 to about 125 parts by weight of extender oil are added per 100 parts by weight of chlorosulfonated or chlorinated polyethylene present in the blend with quantities of from about 70 to 100 parts by weight of extender oil per 100 parts by weight of chlorosulfonated or chlorinated polyethylene being preferred.

Thermoplastic elastomeric vulcanizates prepared as described herein are useful for making a variety of articles such as hoses, belts, gaskets, moldings and molded parts. They are particularly useful for making articles by extrusion, injection molding and compression molding techniques. They are most preferably used for roofing membranes. They also are useful for further modifying thermoplastic resins in general and polyolefin resins in particular. The vulcanizates are suitably blended with thermoplastic resins using conventional mixing equipment. The properties of the modified resin depend upon the amount of vulcanizate blended. Generally, the amount of vulcanizate is sufficient to provide from about 5 to 25 parts by weight of chlorosulfonated or chlorinated polyethylene per hundred parts by weight of the modified resin.

The following examples are for purposes of illustration only and are not to be construed as limiting the scope of the present invention. All parts and percentages are by weight unless otherwise specified. Arabic numerals are used to identify examples representing the present invention whereas alphabetic characters are used to designate comparative examples.

Sample Preparation

A 1450 cubic centimeter (cc) capacity Banbury mixer is used to provide initial melt compounding of all blends and, when appropriate curative components are added and activated, at least partial curing of said blends. Further mixing and, if needed, completion of curing takes place when the contents of the Banbury mixer are placed on a heated two roll mill. Curing may also be completed in a static cure oven.

Single Banbury Mix Procedure

A Banbury mixer is loaded with either the chlorosulfonated or chlorinated polyethylene which is to be dynamically vulcanized, fillers and stabilizers and the semicrystalline thermoplastic polyolefin. The load factor in the Banbury mixer is about 70%. The materials are melt blended in the mixer for about 5 minutes or until the melt temperature is above the melting temperature of the thermoplastic polyolefin employed. The cure package for the chlorosulfonated or chlorinated polyethylene is then added and mixing is continued for 3 minutes at 350° to 401° F. (176.7°–204.4° C). After the curative is exhausted, the thermoplastic chlorosulfonated or chlorinated polyethylene, as appropriate, is added together with its associated fillers and stabilizers. This final loading brings the Banbury load factor to 85%. The mixing is continued at melting temperature for 2 minutes. Then the Banbury is unloaded and the admixture is formed into sheets on a compression mold and preheated to about 400° F. (204.4° C.) at 25 tons of pressure (38.5 hectobars) and the results of the physical properties determined according to standardized test procedures.

Multiple Banbury Mix Procedure

1. Prepare a rubber masterbatch by adding chlorosulfonated or chlorinated polyethylene, crystalline thermoplastic polymer, stabilizers, fillers, plasticizers and other additives to the Banbury mixer while it is operating at moderate speed (about 90 revolutions per minute (rpm)) and cooling water is circulating through the front and rear rotors, right and left sides and fixed sections of the Banbury mixer. As noted hereinabove, the base to be used in conjunction with the vulcanizing material may also function as the stabilizer. The amounts of masterbatch components are not sufficient to give an 85% load factor in the mixing cavity. Mixing continues for about 2.5-5 minutes at which time the temperature of the contents reaches from the melting point up to about 350° F. (approximately 176.7° C.) maximum.

2. Add components to be used in vulcanizing the blend (also known as the "cure package") and continue mixing at about 50 rpm for a period of about 3 minutes at a temperature between about 340 ° and 400° F. (171.1°-204.4° C). The temperature is controlled by varying the mixer speed. The melt mix is sheeted on a two roll mill and sliced into strips for feed to a second Banbury mix.

3. In the second Banbury mix add the vulcanizate made in the second step with a thermoplastic chlorosulfonated or chlorinated polyethylene, as appropriate, additional fillers and stabilizers to the Banbury mixer which is operating at a set temperature of from about 350° F. (approximately 176° C.) to about 400° F. (approximately 204.4° C.). Mixing of the thermoplastic CPE with the vulcanizate continues for about 3 minutes with temperature control as in step 2. This period of time is generally sufficient to completely blend the thermoplastic component of the blend with the vulcanizate resulting in the thermoset chlorosulfonated or chlorinated polyethylene rubber particles being dispersed in a thermoplastic matrix of polyolefin and chlorosulfonated or chlorinated polyethylene.

4. Remove the contents of the Banbury mixer and sheet on a cooled two roll mill. This final rolling is done to cool the melt and prepare sheets used to prepare samples for testing. The contents of the mill in the form of a sheet are fed to a dicer which produces uniformly diced pieces of chlorinated polyethylene/crystalline thermoplastic or chlorosulfonated polyethylene/crystalline thermoplastic dispersed in thermoplastic chlorosulfonated or chlorinated polyethylene or the milled sheets or blankets are compression molded in a 400° F. (204.4° C.) press (3 minutes preheat, 3 minutes pressed at 25 tons (38.5 hectobars), and 3 minutes cooled under pressure. The physical properties are determined in accord with standard tests.

Test Procedures

The following American Society for Testing and Materials (ASTM) Tests are used to characterize the physical properties of materials prepared in accordance with the above procedure:

| | |
|---|---|
| Specific Gravity | ASTM Method D792 |
| Hardness | ASTM Method D2240 |
| Tensile Strength | ASTM Method D412 |
| Elongation | ASTM Method D412 |
| Modulus | ASTM Method D412 |
| Tension Set | ASTM Method D412 |
| Compression Set | ASTM Method D395B |
| Oil Resistance | ASTM Method D471 |
| Heat Resistance | ASTM Method D573 |

Because a crucial test of the applicability of proposed membrane materials is the resistance to cracking caused by microbial species, a test procedure has been devised for determining, on an accelerated basis, whether the sample sheet will resist cracking. The test procedure is a Dextran adhesion and cracking test. It attempts to simulate the attachment and shrinking of microbial colonies on single-ply roofing membranes. Correlation of this accelerated test with actual conditions and materials in the field is still pending.

In the adhesion and cracking test, five 0.3 milliliter drops of a 2.5 weight percent aqueous solution of Dextran (Dextran, 5,000,000-40,000,000 molecular weight, Catalog No. D5501, from Sigma Chemical Co.) are placed on the sample sheet. The sheet is then subjected to light from heat lamps, such as GRO-Lamp's (55°-60° C.) for 3-5 hours or dried in a forced-air oven at 80°-85° C. for 1 hour, until the solution is dried and only Dextran flakes remain. After allowing the sample sheet to cool to room temperature, a piece of pressure sensitive adhesive tape, such as 3M's Scotch brand Magic Tape, is pressed over the flakes and pulled off at a consistent rate. The number of flakes adhering to the tape indicates the extent of adhesion of Dextran to the sample surface. Because adherence is a prerequisite to cracking, the more flakes removed the lower a tendency to crack, or alligator, as it is known in the art. A rating of 5 means all flakes removed.

After the adherence test, the remaining Dextran is washed off the sample sheet and new Dextran drops are applied, dried by the same procedure and then rewetted with a similar size drop of distilled water and dried again. The rewetting and drying cycle is repeated four times, before washing and rating the samples for cracks. The appearance of the sample is reported according to the depth and width of cracks. The crack depth is a logarithmic scale from 4 to 0, with 4 having essentially no surface deformation and 0 being mostly extended through the entire sample. Because it is logarithmic a rating of 1.5 indicates more than twice the damage of a 3 rating. The cracks are also rated as to type. Thus, a surface crack (s) indicates surface peeling, layering, and microcracks; a wide crack (w) can be superficial or deep; and a sharp crack (sp) indicates a narrow, penetrating type of crack. The surface cracks are mainly cosmetic and can range from 4-3 in penetration depth; wide cracks sometimes penetrate deep and can range from 4-1.5; sharp cracks can penetrate entirely through the membrane and can range from 4-0.

Further, the samples can be exposed to UV radiation in a Xenotest 1200 unit from Heraeus, Inc., West Germany, in order to simulate the effect of sunlight on the cracking process. UV light also promotes photooxidation and, therefore, Dextran adhesion. Thus, the UV exposure causes those samples which show little initial Dextran adhesion to experience similar deforming forces. Again correlation with field tests is pending. However, in evaluating samples, experience has shown that the removal of more flakes in the tape test after the same UV exposure time or the need for longer UV exposure in order to cause similar adhesion indicates a lower tendency toward alligatoring.

Examples 1–8 and Comparative Example A

In a Banbury mixer the various formulations given were mixed according to the general procedure described above. After mixing, sample sheets were prepared and tested for Shore hardness, melt viscosity and Dextran adhesion and cracking. Each formulation also contained the following fillers, stabilizers, pigments, processing aids, etc.

- A. Marinco H, (magnesium hydroxide used as activator for vulcanization), Calgon Corp., 5 phr.
- B. Tetrasodium pyrophosphate (TSPP), antioxidant or inhibitor, from Monsanto Co., 5 phr.
- C. Irganox* 1010, antioxidant, Ciba-Geigy Corp., 2 phr.
- D. Irganox* 1076, antioxidant, Ciba-Geigy Corp., 2 phr.
- E. Weston* 619, antioxidant, Borg Warner Chemical Co., 4 phr.
- Omycarb* UF, calcium carbonate filler, Omya, Inc., 20 phr.
- G. $TiO_2$ Type R960, filler, SCM Chemicals, 10 phr.
- H. HiSil 233, hydrated amorphous silica as filler, PPG Industries, Inc., 5 phr.
- I. Saniticizer 711, di ($C_7$-$C_9$-$C_{11}$ alkyl phthalate, Monsanto Co., 100 phr.
- J. Echo-S, mercapto-thiadiazole derivative vulcanizers, Hercules, Inc., 3 phr.
- K. Vanax 808, condensation product of analine and buteraldehyde, R. T. Vanderbilt Co., Inc., 59 phr.
- L. Ultranox 626, antioxidant, Borg Warner Chemical Other additives which may be used in the place of or in addition to various of the above listed materials are given as follows:

- M. ERL 422, chemical and heat stabilizer, Union Carbide Corporation;
- N. Mark 1177, chemical and heat stabilizer, Argus Chemical Corporation;
- O. TBABr, tetrabutylammonium bromide vulcanization accelerator, Nobel Chemicals; and
- P. Vanchem* DMTD, 2,5-dimercapto-1,3,4-thiadiazole vulcanizer, R. T. Vanderbilt Company, Inc.

The following Table gives the results of the Examples of this invention and the comparative experiments.

TABLE
THERMOPLASTIC CHLOROSULFONATED/CHLORINATED POLYETHYLENE VULCANIZATES

| Example No. or Comparative Example No. | A | 1 | 2 | 3 | 4 | 5 | 6 | 7 | 8 |
|---|---|---|---|---|---|---|---|---|---|
| Formulation: | | | | | | | | | |
| Vulcanized Chlorosulfonated Polyethylene | — | — | 44 | — | 40 | — | 40 | — | — |
| Vulcanized Chlorinated Polyethylene | — | — | — | — | — | — | — | — | 40 |
| Ultra-Low Density Polyethylene | — | 23 | 22 | 21 | 20 | 21 | 20 | 21 | 20 |
| Thermoplastic Chlorosulfonated Polyethylene | 64 | 46 | — | 41 | — | 51 | 10 | 10 | 10 |
| Thermoplastic Chlorinated Polyethylene | — | — | — | 10 | 10 | — | — | 41 | — |
| Physical Properties: | | | | | | | | | |
| Specific Gravity | 1.36 | 1.28 | 1.28 | 1.25 | 1.26 | 1.24 | 1.25 | 1.25 | 1.26 |
| 100% Modulus | 397 | 603 | 785 | 637 | 779 | 647 | 740 | 768 | 1010 |
| 200% Modulus | 480 | 627 | 984 | 724 | 987 | 737 | 982 | 850 | 1154 |
| Ultimate Tensile, psi | 1202 | 1620 | 1273 | 1452 | 1264 | 1358 | 1288 | 1455 | 1198 |
| Elongation, % | 788 | 823 | 394 | 668 | 342 | 662 | 342 | 699 | 313 |
| Rebound | 42 | 33 | 34 | 32 | 32 | 37 | 33 | 30 | 26 |
| Low Temperature Brittleness, °C. | −32 | <−50 | −41 | <−50 | −34 | −36 | −49 | — | — |
| Results | | | | | | | | | |
| Hardness, Shore A | 80 | 90 | 87 | 86 | 92 | 86 | 90 | 89 | 89 |
| Viscosity, V3 | 264 | 117 | 444 | 192 | 652 | 162 | 583 | 173 | 314 |
| V300 | 14751 | 10933 | 19842 | 13494 | 22339 | 13493 | 21035 | 11750 | 15158 |
| V3/V300 | 17.9 | 10.7 | 22.4 | 14.2 | 29.2 | 12.0 | 27.7 | 14.8 | 20.7 |
| Dextran Test | | | | | | | | | |
| *0 hours UV @ 80° C.* | | | | | | | | | |
| No. flakes removed | 0 | 2.7 | 5 | 5 | 5 | 4.6 | 5 | 4.8 | 5 |
| Cracks | W | W | S | S | S | S | S | S | S |
| Rating | 1.5 | 2.5 | 3.9 | 3.9 | 3.9 | 3.9 | 3.9 | 3.9 | 3.9 |
| *50 hours UV @ 80° C.* | | | | | | | | | |
| No. flakes removed | 0 | 1.2 | 1.5 | 3.4 | 0 | 1 | 3.3 | 4.9 | 5 |
| Cracks | W | W | W | S | W | W | S | S | S |
| Rating | 1.5 | 2.5 | 3 | 3.2 | 3 | 2.5 | 3 | 3.8 | 3.8 |

TABLE-continued
THERMOPLASTIC CHLOROSULFONATED/CHLORINATED POLYETHYLENE VULCANIZATES

| Example No. or Comparative Example No. | A | 1 | 2 | 3 | 4 | 5 | 6 | 7 | 8 |
|---|---|---|---|---|---|---|---|---|---|
| 100 hours UV @ 80° C. | | | | | | | | | |
| No flakes removed | 0 | 0.2 | 0 | 0.6 | 0 | 0.1 | 0 | 5 | 5 |
| Cracks | W | W | Sp | W | Sp | W | W | S | S |
| Rating | 1.5 | 2.5 | 2.5 | 3 | 2.5 | 2.5 | 2.5 | 3.8 | 3.8 |
| 200 hours UV @ 80° C. | | | | | | | | | |
| No flakes removed | 0 | 0 | 0 | 0 | 0 | 0 | 0 | 4.9 | 4.8 |
| Cracks | Sp | W | Sp | Sp | W | Sp | Sp | S | S |
| Rating | 2.5 | 2.5 | 2.5 | 2 | 2.5 | 2 | 3 | 3.9 | 3.9 |
| 400 hours UV @ 80° C. | | | | | | | | | |
| No flakes removed | 0 | 0 | 0 | 0 | 0 | 0 | 0 | 5 | 0 |
| Cracks | W | Sp | Sp | Sp | Sp | Sp | Sp | S | Sp |
| Rating | 1.5 | 2.5 | 2 | 1 | 2.5 | 2 | 2.5 | 3.9 | 2.5 |
| Shrinkage - original Specimen | | | | | | | | | |
| Length - 5.758 in | 5.222 | 5.631 | 5.646 | 5.649 | 5.658 | 5.586 | 5.636 | 5.695 | 5.672 |
| Width - 2.01 in | 1.50 | 1.943 | 1.957 | 1.950 | 1.955 | 1.939 | 1.961 | 1.975 | 1.982 |
| Area (IXw) - 11.5736 cm$^2$ | 7.8330 | 10.941 | 11.049 | 11.0156 | 11.0614 | 10.8313 | 11.0522 | 11.2476 | 11.2419 |
| % Area retained | 67.7 | 94.5 | 95.5 | 95.2 | 95.6 | 93.6 | 95.5 | 97.2 | 97.1 |
| Heat Distortion @80° C. | 43.1 | 5.3 | 0 | 1.7 | 1.2 | 7.1 | 1.6 | 1.8 | 1.4 |
| Heat weld strength (initial), psi | 23.0 | 31.5 | 25 | 30.5 | 31.5 | 33.0 | 24.5 | 45 | 29.0 |

As seen in the above results of tests in which a chlorosulfonated polyethylene alone was subjected to the tests in Comparative Example A along with examples of various aspects of this invention, the present materials had much improved heat distortion and initial weld strength. Further, the examples of this invention shrank considerably less than did the chlorosulfonated polyethylene per se. Further, improvement is noted in the tendency to crack over the comparative material.

What is claimed is:

1. A thermoplastic elastomer blend, having a tension set value at 100% elongating of less than 50%, comprising from about 35 to about 50 parts of a vulcanized chlorined polyethylene, from about 15 to about 30 parts of a crystalline thermoplastic polyolefin polymer, and from about 15 to about 60 parts of a thermoplastic non-crosslinked amorphous or semicrystalline chlorosulfonated polyethylene.

2. A thermoplastic elastomer blend, having a tension set value at 100% elongation of less than 50%, comprising from about 35 to about 50 parts of vulcanized chlorosulfonated polyethylene, from about 15 to about 30 parts of a crystalline thermoplastic polyolefin polymer, and from about 15 to about 60 parts of a thermoplastic non-crosslinked amorphous or semicrystalline chlorosulfonated polyethylene.

3. A thermoplastic elastomer blend, having a tension set value at 100% elongation of less than 50% comprising from about 35 to about 50 parts of a vulcanized chlorosulfonated polyethylene, from about 15 to about 30 parts of a crystalline thermoplastic polyolefin polymer, and from about 15 to about 60 parts of a thermoplastic non-crosslinked amorphous or semicrystalline chlorinated polyethylene.

4. A roofing membrane material prepared from the composition of any one of claims 1, 2, or 3, which is resistant to environmentally induced cracking.

5. A roofing membrane material prepared from the composition of any one of claims 1, 2, or 3, having a heat resistance area retention of at least 90% when measured at 125° C. under conditions of ASTM D573.

* * * * *